United States Patent
Garcarz et al.

(10) Patent No.: US 12,470,476 B2
(45) Date of Patent: Nov. 11, 2025

(54) PREDICTIVE APPLICATION-AWARE ROUTING FOR REMOTE WORK

(71) Applicant: Cisco Technology, Inc., San Jose, CA (US)

(72) Inventors: Michal Wladyslaw Garcarz, Cracow (PL); Jean-Philippe Vasseur, Saint Martin d'Uriage (FR); Eduard Schornig, Haarlem (NL); Grégory Mermoud, Venthône (CH); Vinay Kumar Kolar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 320 days.

(21) Appl. No.: 17/877,923

(22) Filed: Jul. 30, 2022

(65) Prior Publication Data
US 2024/0039838 A1 Feb. 1, 2024

(51) Int. Cl.
*G06F 15/173* (2006.01)
*H04L 41/22* (2022.01)
*H04L 45/02* (2022.01)
*H04L 45/302* (2022.01)

(52) U.S. Cl.
CPC ........... *H04L 45/302* (2013.01); *H04L 41/22* (2013.01); *H04L 45/08* (2013.01)

(58) Field of Classification Search
None
See application file for complete search history.

(56) References Cited

U.S. PATENT DOCUMENTS

| | | | |
|---|---|---|---|
| 8,717,875 B2* | 5/2014 | Bejerano | H04L 45/04 370/218 |
| 10,348,571 B2* | 7/2019 | Mehta | H04L 43/0829 |
| 10,958,555 B2* | 3/2021 | Kumar | H04L 43/20 |
| 11,134,023 B2 | 9/2021 | Thiel et al. | |
| 11,297,149 B2 | 4/2022 | Bugenhagen et al. | |
| 2006/0020694 A1* | 1/2006 | Nag | H04L 41/22 715/700 |
| 2015/0056960 A1* | 2/2015 | Egner | H04W 4/027 455/411 |
| 2015/0078332 A1* | 3/2015 | Sidhu | H04M 7/1235 370/331 |
| 2017/0134990 A1* | 5/2017 | Egner | H04W 28/26 |
| 2018/0375735 A1* | 12/2018 | Hale | H04L 45/00 |
| 2019/0007882 A1* | 1/2019 | Hudson | H04W 4/40 |
| 2019/0140933 A1* | 5/2019 | Guim Bernat | H04L 47/2425 |
| 2019/0215755 A1* | 7/2019 | Faynberg | G16H 10/00 |
| 2019/0349426 A1* | 11/2019 | Smith | H04W 4/70 |
| 2021/0160334 A1 | 5/2021 | Yeddula et al. | |

(Continued)

*Primary Examiner* — Phuoc H Nguyen
(74) *Attorney, Agent, or Firm* — Lee & Hayes, P.C.

(57) ABSTRACT

In one embodiment, a device discovers one or more network interfaces that an endpoint in a local network could use to access an online application. The device identifies a plurality of connectivity options available to the endpoint to access the online application via an external network. The device makes a prediction that a path that comprises a particular connectivity option from among the plurality of connectivity options and a particular network interface from among the one or more network interfaces will provide an optimal quality of experience metric associated with the online application. The device causes the endpoint to use the path to connect to the online application.

20 Claims, 10 Drawing Sheets

(56) References Cited

U.S. PATENT DOCUMENTS

| | | |
|---|---|---|
| 2021/0367832 A1 | 11/2021 | Ramachandran et al. |
| 2022/0036265 A1 | 2/2022 | Yang et al. |
| 2024/0007414 A1* | 1/2024 | Jain .................... H04L 41/0823 |
| 2024/0031277 A1* | 1/2024 | Dasgupta .............. H04L 41/149 |

* cited by examiner

PREDICTIVE APPLICATION-AWARE ROUTING FOR REMOTE WORK

TECHNICAL FIELD

The present disclosure relates generally to computer networks, and, more particularly, to predictive application-aware routing for remote work.

BACKGROUND

In recent years, work-from-home and hybrid work options have grown considerably in popularity. For such setups to be effective, though, the application experience for the various online applications accessed by a remote worker needs to be at an acceptable level. Indeed, the productivity of most remote workers is directly a function of the quality of experience provided by the various online applications that they use. For instance, a videoconferencing application that keeps freezing on a remote worker may greatly impact their ability to perform their work duties.

Typically, security considerations are at the forefront of any Information Technology (IT) decision with respect to remote workers. For instance, in many cases, a remote worker may be required to first log into a virtual private network (VPN) of their employer via a default location (e.g., a VPN connection point located in Chicago). In turn, the traffic for the various applications is then conveyed over the VPN connection, such as through a backhaul connection via an enterprise datacenter. However, little to no consideration is given to the effect that the choice of enterprise connectivity has on the application experience. To complicate things further, there is also typically little insight on behalf of the IT personnel regarding the local/home network of the remote worker, which could itself influence the quality of experience provided by the various online applications to the remote worker.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
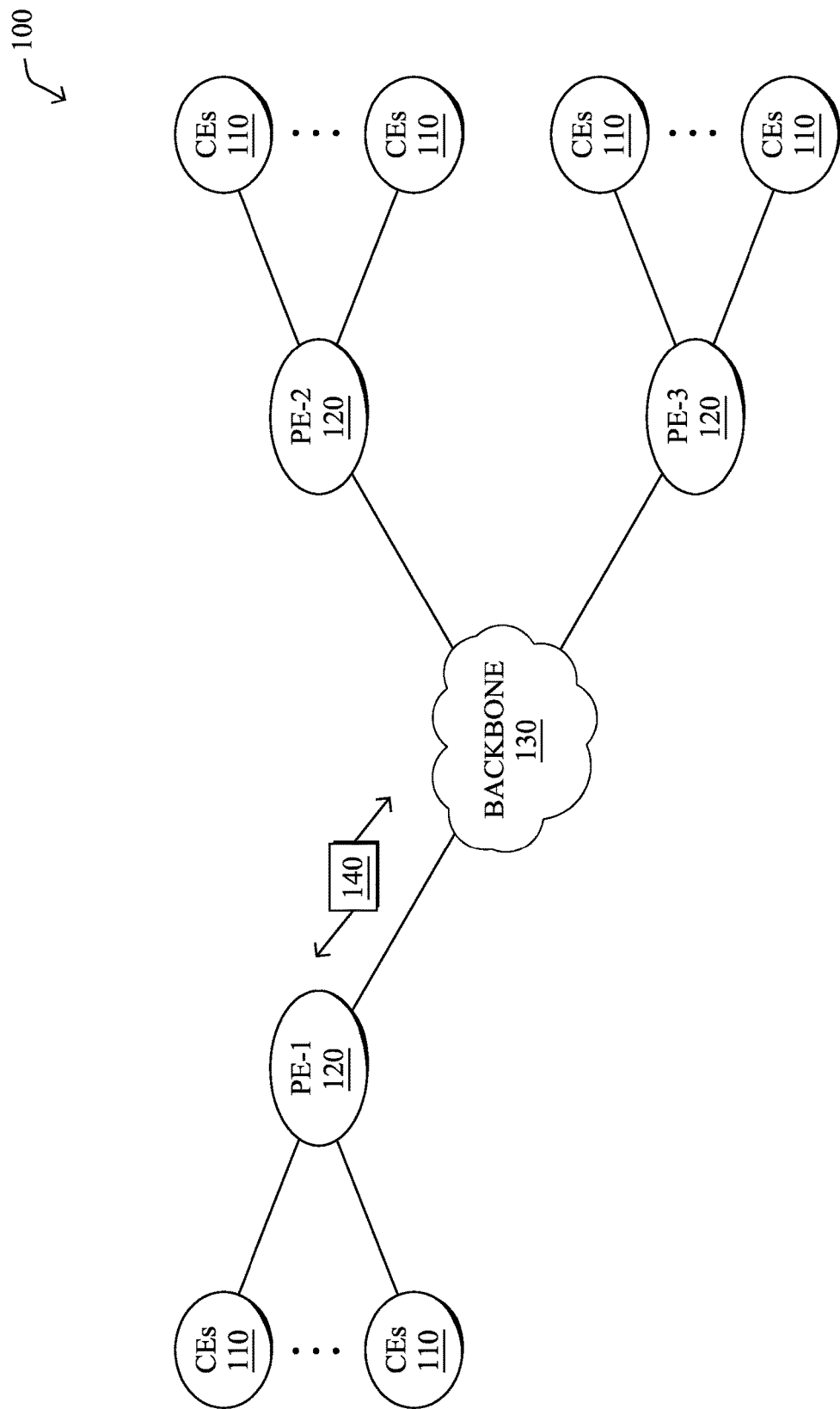
FIGS. 1A-1B illustrate an example communication network.

According to one or more embodiments of the disclosure, a device discovers one or more network interfaces that an endpoint in a local network could use to access an online application. The device identifies a plurality of connectivity options available to the endpoint to access the online application via an external network. The device makes a prediction that a path that comprises a particular connectivity option from among the plurality of connectivity options and a particular network interface from among the one or more network interfaces will provide an optimal quality of experience metric associated with the online application. The device causes the endpoint to use the path to connect to the online application.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.
2.) Site Type B: a site connected to the network by the CE router via two primary links (e.g., from different Service Providers), with potentially a backup link (e.g., a 3G/4G/5G/LTE connection). A site of type B may itself be of different types:
2a.) Site Type B1: a site connected to the network using two MPLS VPN links (e.g., from different Service Providers), with potentially a backup link (e.g., a 3G/4G/5G/LTE connection).
2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.
2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
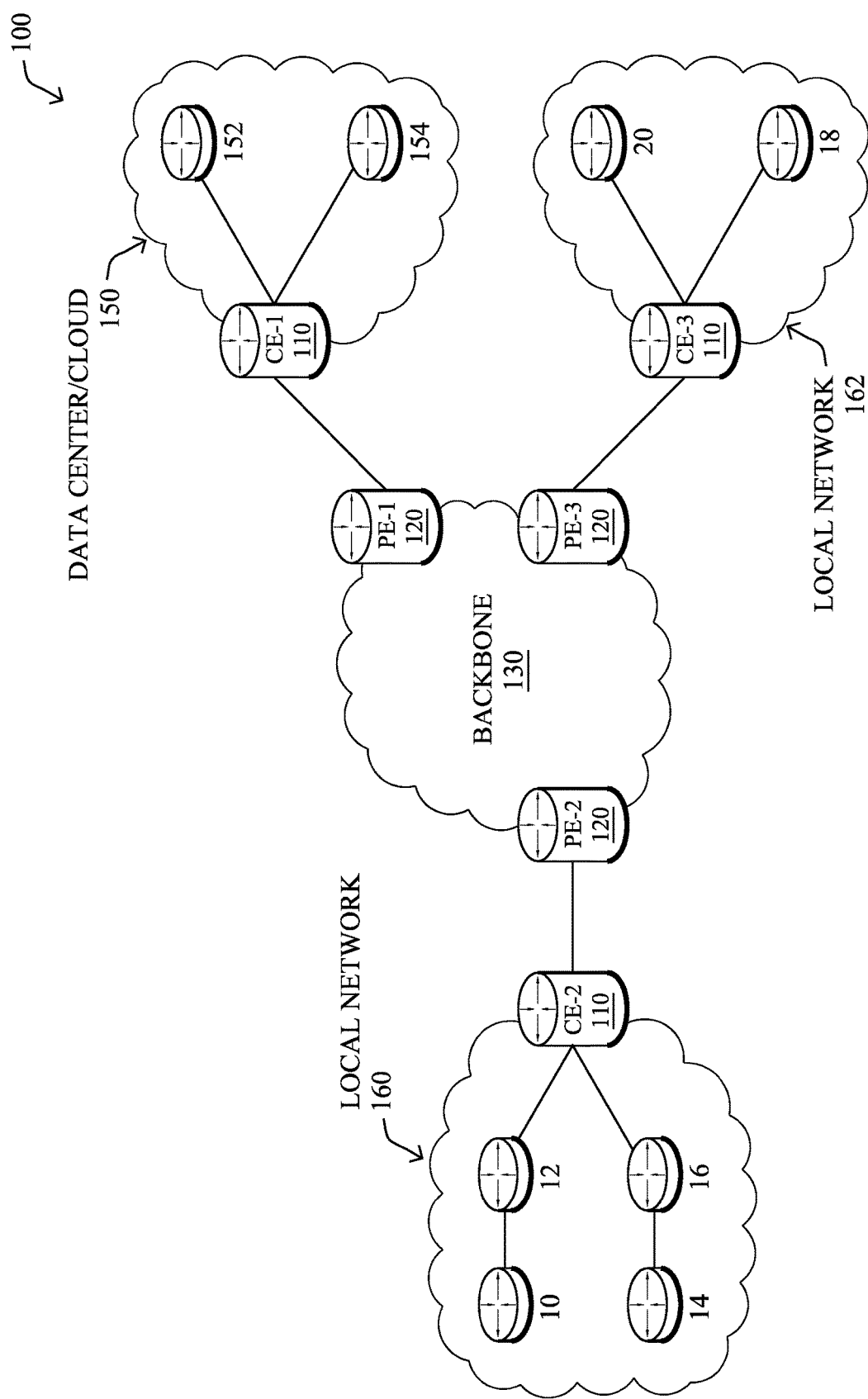

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
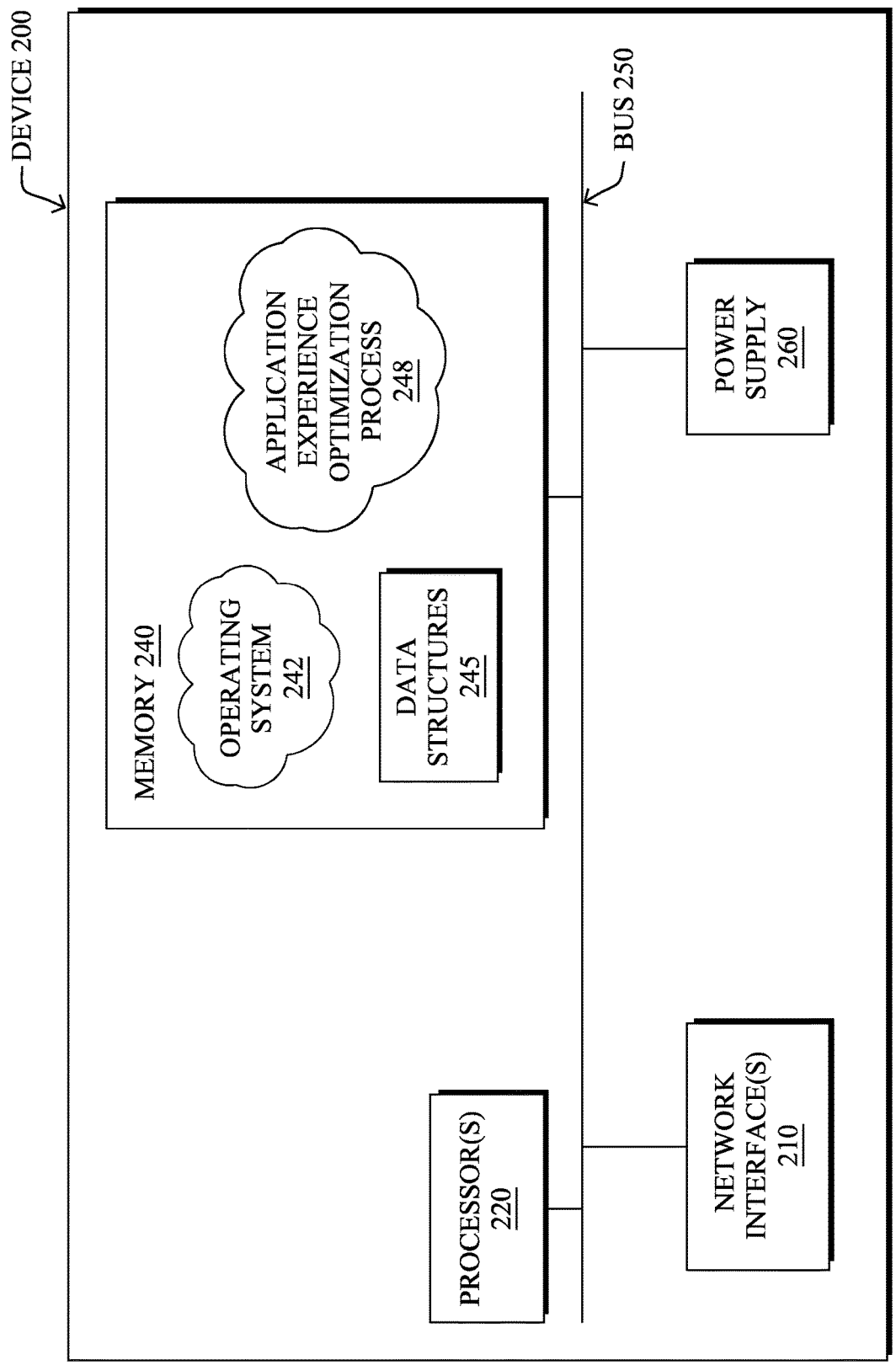
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a application experience optimization process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, application experience optimization process 248 contains computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, application experience optimization process 248 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, application experience optimization process 248 may include computer executable instructions that, when executed by processor(s) 220, cause device 200 to perform the techniques described herein. To do so, in some embodiments, application experience optimization process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, application experience optimization process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that application experience optimization process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software as a service (SaaS) is having a dramatic impact of the overall Internet due to the extreme virtualization of services and shift of traffic load in many large enterprises. Consequently, a branch office or a campus can trigger massive loads on the network.

Figure 3A:
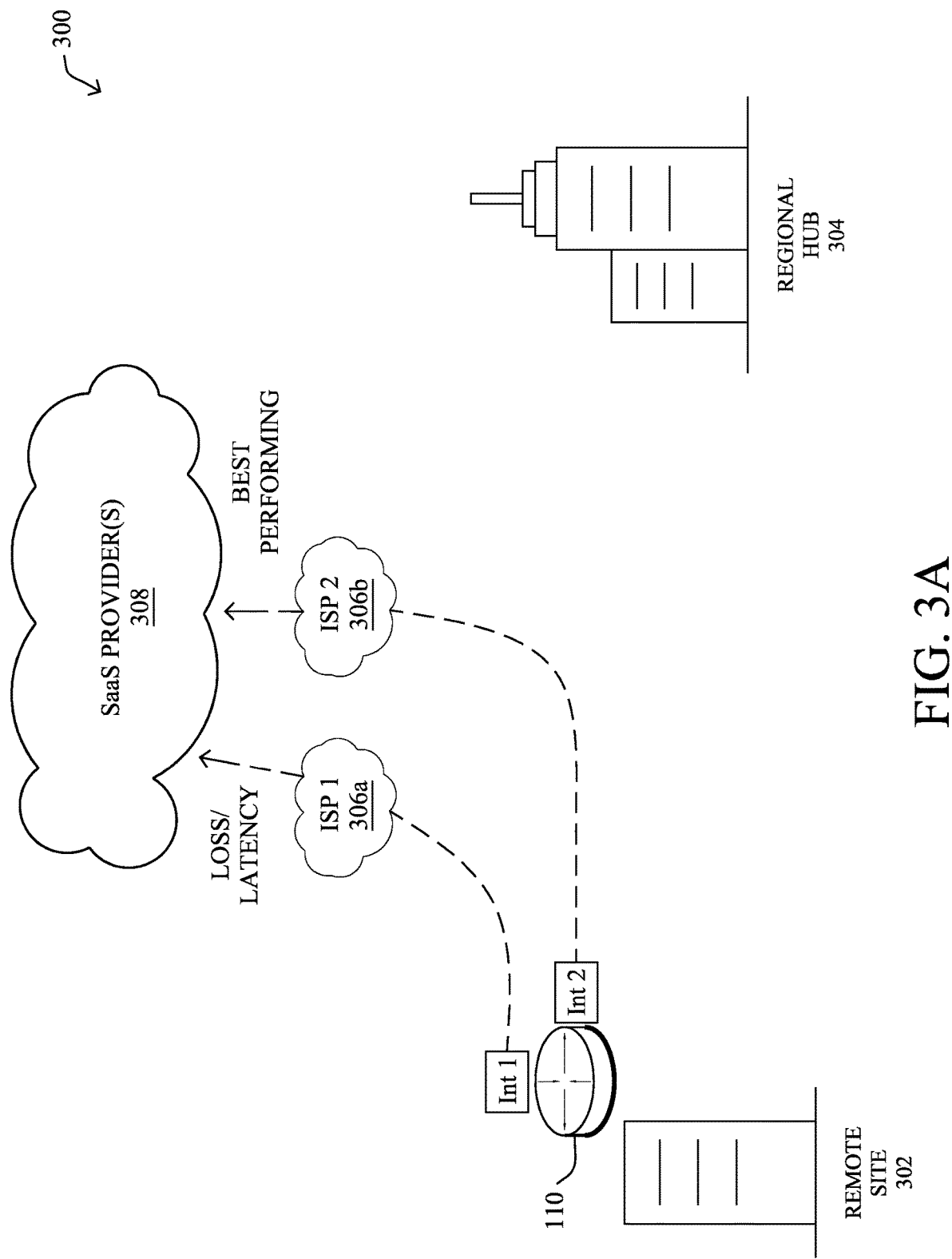
FIGS. 3A-3B illustrate example network deployments.
Figure 3B:
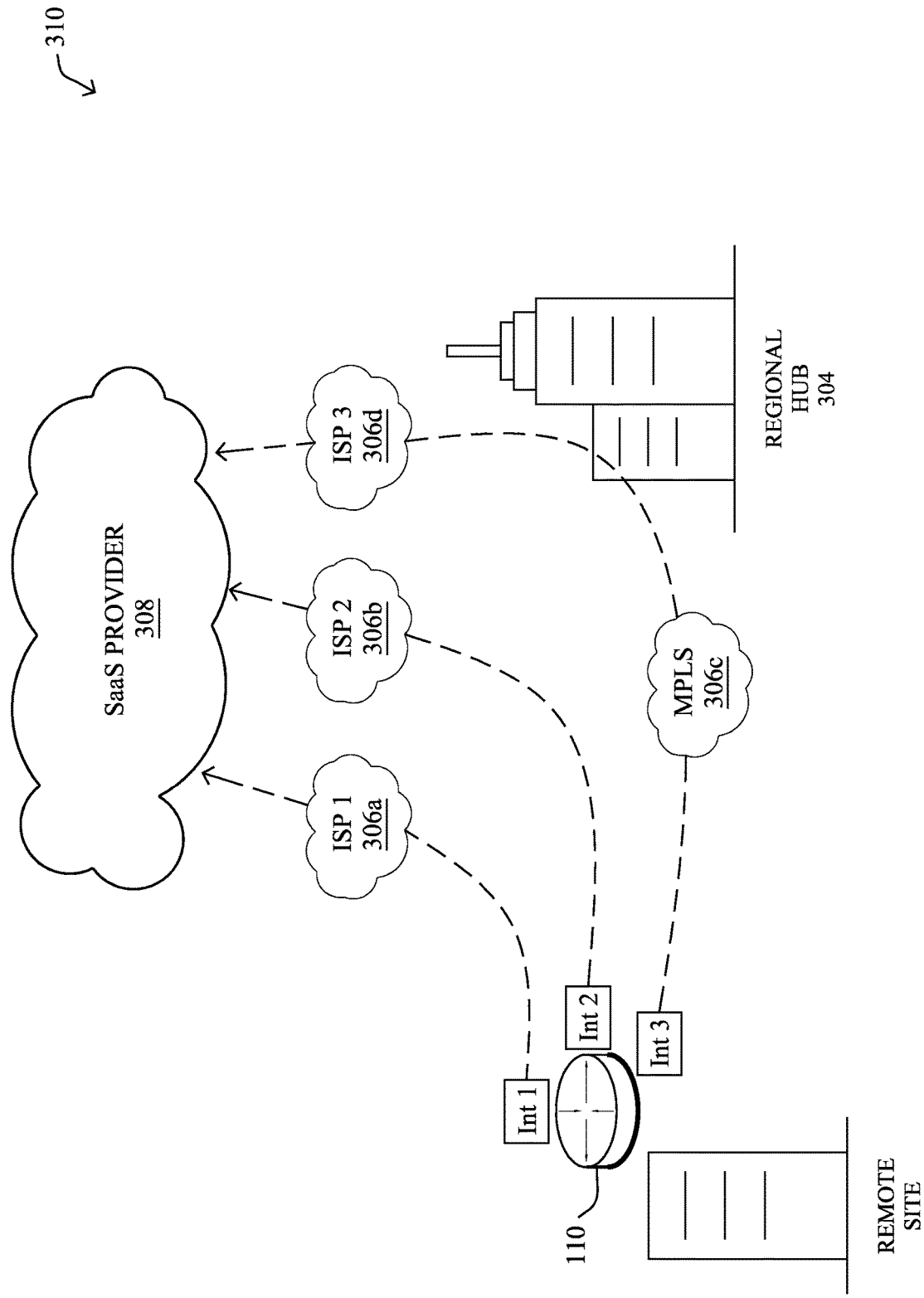

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
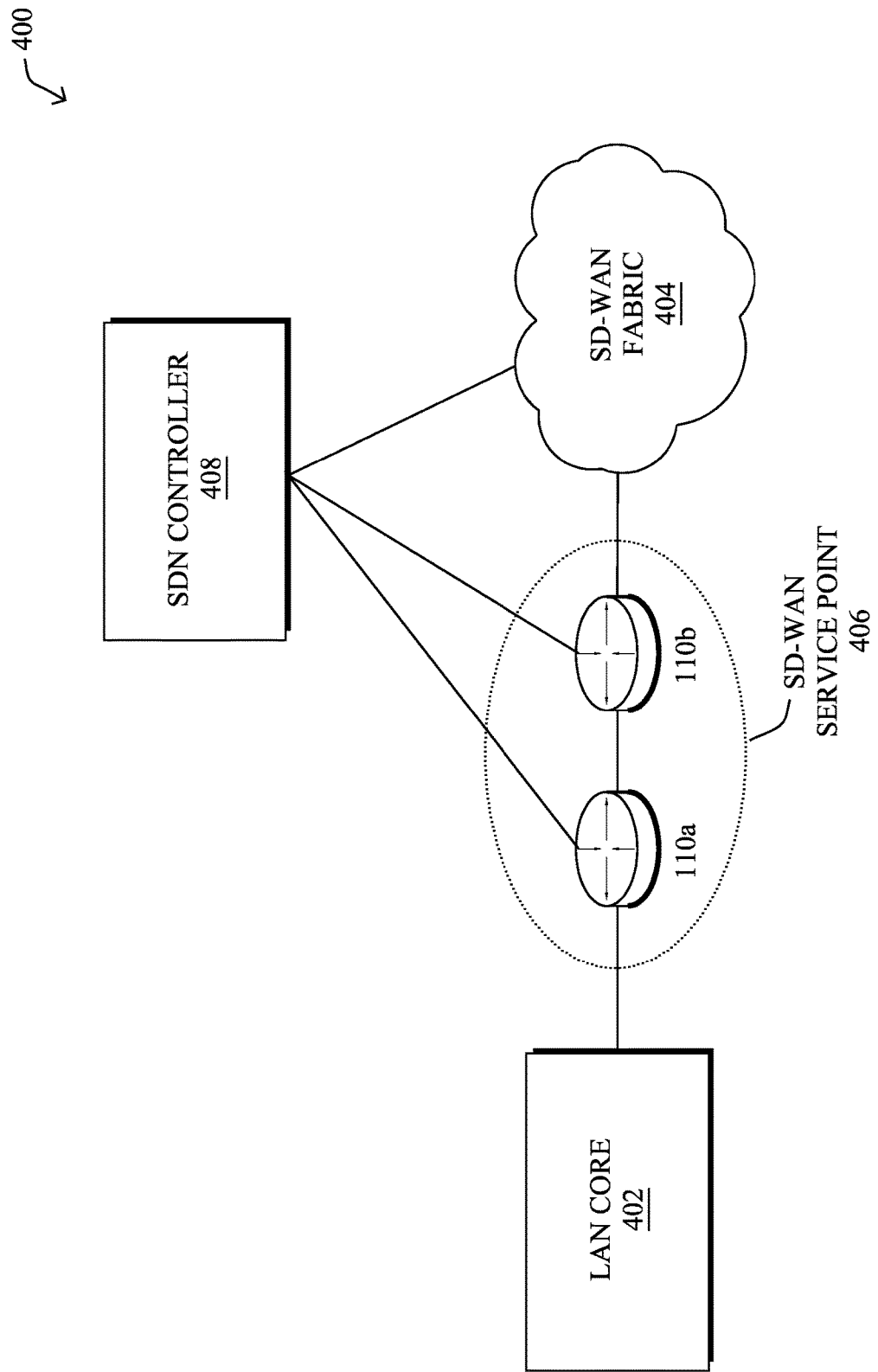
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B and the like.

As noted above, a primary networking goal may be to design and optimize the network to satisfy the requirements of the applications that it supports. So far, though, the two worlds of "applications" and "networking" have been fairly shoed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;

New SaaS applications being deployed everywhere in the network, hosted by a number of different cloud providers;

Internet, MPLS, LTE transports providing highly varying performance characteristics, across time and regions;

SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to rout traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

- The SLA for the application is 'guessed,' using static thresholds.
- Routing is still entirely reactive: decisions are made using probes that reflect the status of a path at a given time, in contrast with the notion of an informed decision.
- SLA failures are very common in the Internet and a good proportion of them could be avoided (e.g., using an alternate path), if predicted in advance.

Figure 4B:
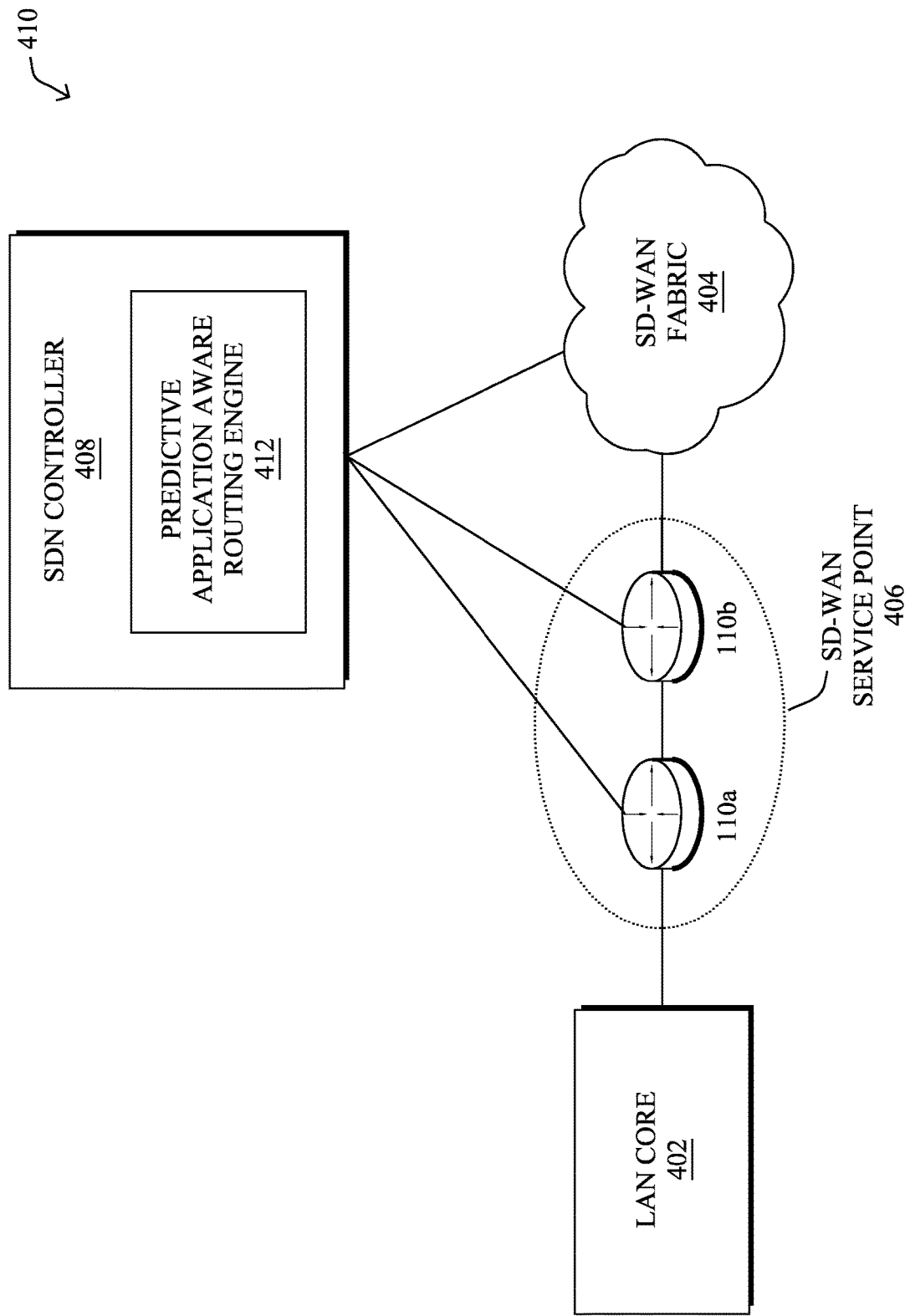

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of application experience optimization process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment.

As would be appreciated, modern SaaS applications are typically delivered globally via public cloud infrastructure: using cloud native services. Even though public cloud providers may have a high number of points of presence (PoPs) and use those to deliver the application, globally. Still, testing has shown that user quality of experience (QoE) may vary greatly based on the location of the user. This is because all public cloud providers are delivering services which are region-based and applications are running in specific region(s) and location(s). Indeed, even though it might seem that an online application is global (e.g., because of its use of globally-available CloudFront POPs, etc.), in reality it might run in a single region/location and user experience might vary greatly based on the location.

To determine the QoE for a particular SaaS application, various approaches are possible such as:
- Obtaining user feedback directly from the application
- Applying traffic analytics, such as by analyzing Netflow records that include extra metrics like Application Response Time (ART)
- Sending synthetic path probes to measure networking metrics to each SaaS application from each location. These probes are 'synthetic' in that they seek to mimic the actual characteristics of the traffic of the application under scrutiny.

The first approach above is rarely used today because of its complexity, but can still be used with the techniques herein. Note that relying on direct user feedback to drive routing decisions would also require supporting application programming interfaces (APIs) and the relevant network telemetry, in order to optimize the routing. The second and third approaches above are well-suited for use in Secure Access Service Edge (SASE)/SD-WAN implementations.

In various embodiments, predictive application aware routing engine 412 may make use of any or all of the above approaches. For instance, predictive application aware routing engine 412 may make use of an API for a particular online application, allowing it to obtain application experience/QoE metrics directly from the application. Such metrics may be combined with probing results and/or path telemetry. This is in sharp contrast to network-centric approaches that do not necessarily reflect the true user experience.

As would be appreciated, SASE has emerged in the past few years as an important trend and concept in security and networking. In general, SASE is a network architecture whereby WAN and security are provided jointly as a service, through the use of secure gateways that combine WAN access and cloud-delivered firewalls and security. The overall intent of a SASE is to simplify the network architecture, by connecting all locations to a SASE gateway managed by a provider, such as Cisco Umbrella by Cisco Systems, Inc.

The SASE gateway is then responsible for all security policies, as well as for providing WAN connectivity.

SASE providers host their gateways in points of presence (PoPs) around the world, and locations are usually connected to the closest PoP, either in purely geographical terms, or in terms of routing topology using AnyCast. To do so, the location typically establishes a simple, unique, and secure tunnel to the correspond PoP, and all traffic is sent to the provider.

Figure 5:
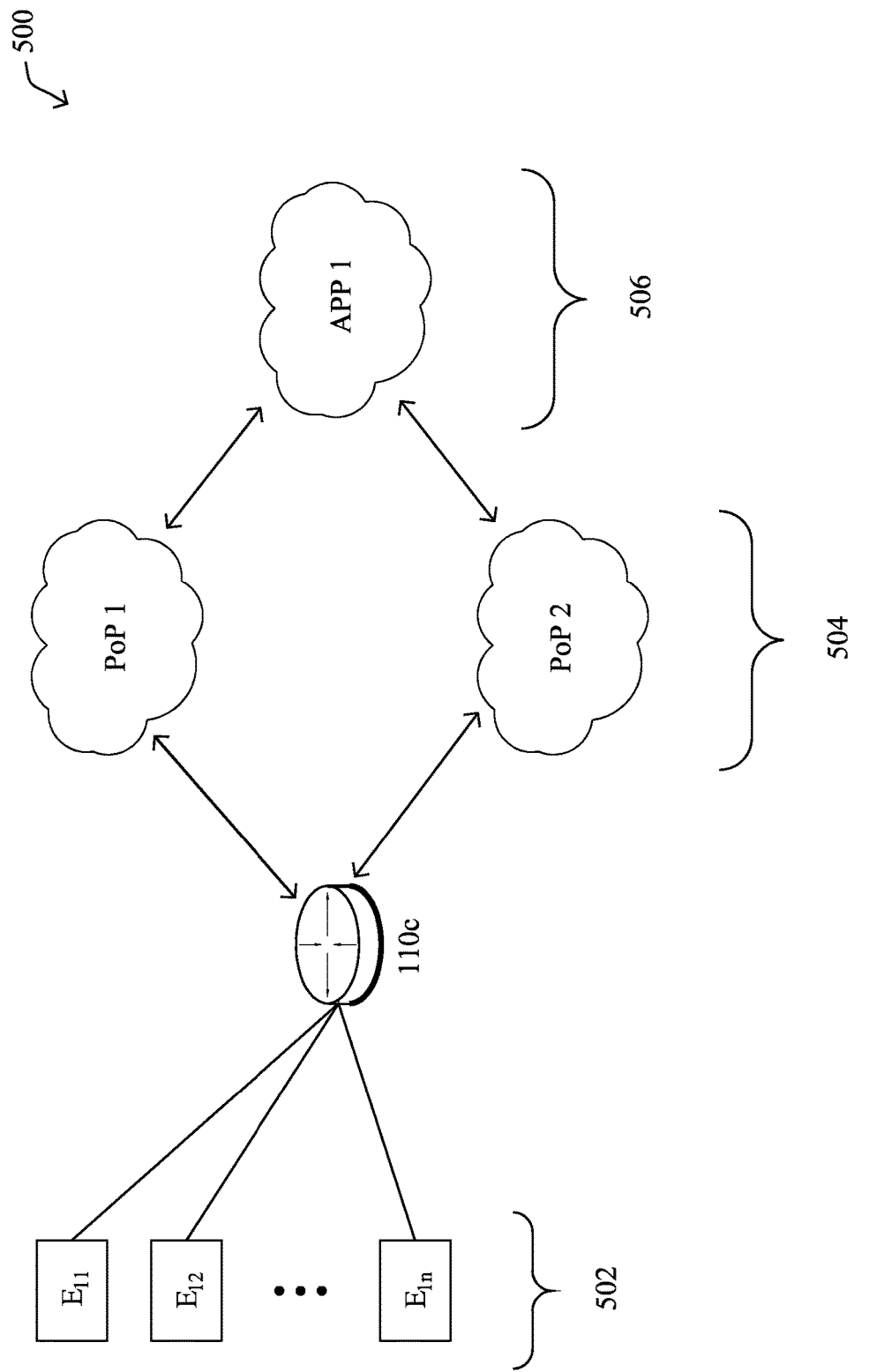
FIG. 5 illustrates an example of an edge router connecting to a cloud-hosted application via multiple points of presence (PoPs)

FIG. 5 illustrates an example 500 of an edge router 110c accessing a cloud-hosted application 506. As shown, assume that there are n-number of endpoints 502 at a particular location for which edge router 110c provides external connectivity. Under a SASE model, a SASE provider may maintain any number of PoPs 504 to which edge router 110c may connect. Accordingly, edge router 110c may access a cloud-hosted application 506, such as an SaaS application, via a first PoP among PoPs 504, a second PoP among PoPs 504, etc. A similar architecture is also often utilized by application providers themselves, with many applications being hosted across multiple cloud providers, content delivery networks (CDNs), load balancers, and the like.

As rioted above, work-from-home and hybrid work options (e.g., by allowing a worker to work remotely one or more days a week) have grown considerably in popularity. For such setups to be effective, though, the application experience for the various online applications accessed by a remote worker needs to be at an acceptable level. Indeed, the productivity of most remote workers is directly a function of the quality of experience provided by the various online applications that they use. For instance, a videoconferencing application that keeps freezing on a remote worker may greatly impact their ability to perform their work duties.

While application-aware predictive routing, such as that performed by predictive application aware routing engine 412, can aid in the optimization of the application experience of an online application, remote work presents unique challenges to an enterprise. Indeed, while the network and device configurations in an office or other location under the control of an enterprise are known a priori, the same can rarely be said about those of a remote worker.

In addition, a simplistic approach is often taken with respect to remote workers, such as by forcing a remote worker to connect to a virtual private network (VPN) via the geographically-closest access location for the VPN. However, such a requirement does not take into account the effects of doing so on the application experience of any online applications accessed by the remote worker.

By way of example, consider again the case shown in FIG. 3B, this time with remote site 302 representing a local network of a remote worker, such as home network. In such situations, there may be one or more interface options available to an endpoint, to access SaaS provider 308, both within the local network itself, as well as from the local network to an external network. For instance, within the local network itself, the endpoint could leverage any or all of the following to connect to router 110, which may be a home router in this case:

A Wi-Fi interface via any number of different wireless channels (e.g., any of the channels in the 2.4 GHz, 5 GHz, etc. spectrums), service set identifiers (SSIDs), or the like.
An Ethernet or other wired connection.
Etc.

In addition, any or all of the following types of interfaces may be used to access SaaS provider 308 via an external network:

A cellular interface—e.g., 5G, LTE, etc. (e.g., router 110 may take the form of a cellular hotspot or tethered cellular phone)
A broadband interface—e.g., fiber optic, coaxial, digital subscriber line (DSL), etc.
A satellite interface
Etc.

Beyond the possible interfaces that a remote endpoint at remote site 302 could use to access provider(s) 308, a plurality of connectivity options may also exist that are available to provide the endpoint with access to provider(s) 308. For instance, any of following connectivity options may be available, among others:

Direct Internet Access (DIA)
Backhaul via any number enterprise locations, which may be geographically diverse
Connecting through a Secure Internet Gateway (SIG)/SSE provider, which may be accessed via a variety of different PoPs—such cloud-services are growing in popularity and provide cloud-based security services, an example of which is Cisco Umbrella.

Predictive Application-Aware Routing for Remote Work

The techniques herein introduce mechanisms to optimize the application experience of online applications accessed by remote workers. In some aspects, the techniques herein can automatically discover all active and potential logical paths that could be used by the endpoint of a remote worker to access an online/SaaS application. In further aspects, once these potential paths have been discovered, a predictive routing engine may predict their effects on the application experience and select the optimal one from among the set for use by the endpoint.

Illustratively, the techniques described herein may be performed by hardware, software, and/or firmware, such as in accordance with application experience optimization process 248, which may include computer executable instructions executed by the processor 220 (or independent processor of interfaces 210) to perform functions relating to the techniques described herein.

Specifically, according to various embodiments, a device discovers one or more network interfaces that an endpoint in a local network could use to access an online application. The device identifies a plurality of connectivity options available to the endpoint to access the online application via an external network. The device makes a prediction that a path that comprises a particular connectivity option from among the plurality of connectivity options and a particular network interface from among the one or more network interfaces will provide an optimal quality of experience metric associated with the online application. The device causes the endpoint to use the path to connect to the online application.

Figure 6:
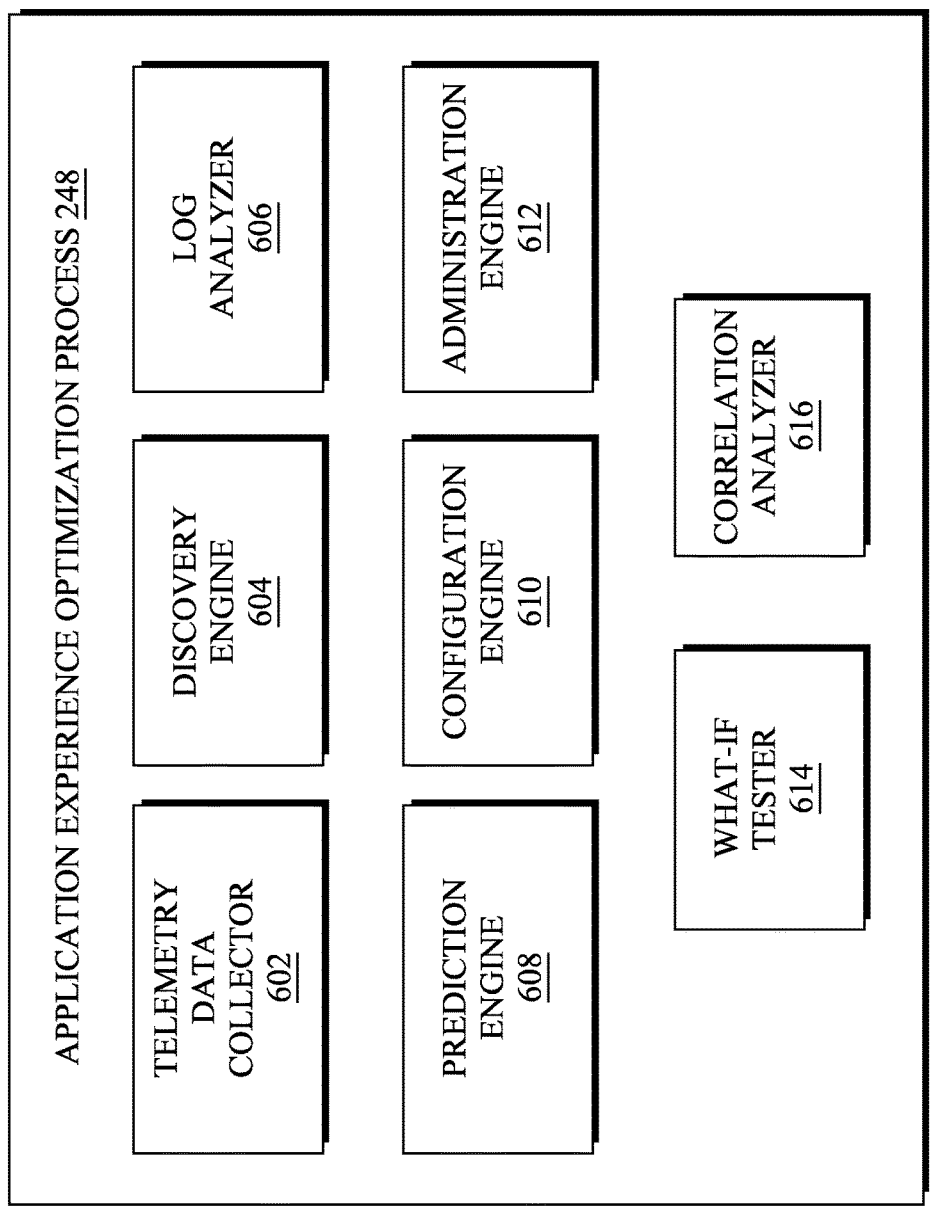
FIG. 6 illustrates an example architecture for predictive application-aware routing for remote work.

Operationally, FIG. 6 illustrates an example architecture 600 for predictive application-aware routing for remote work, according to various embodiments. At the core of architecture 600 is application experience optimization process 248, which may be executed by a controller for a network or another device in communication therewith. For instance, application experience optimization process 248 may be executed by a controller for a network (e.g., SDN controller 408 in FIGS. 4A-4B), a particular networking device in the network (e.g., a router, etc.), a client in a network, another device or service in communication therewith, or the like. In further embodiments, architecture 600 may be implemented as part of a SASE deployment.

As shown, architecture 600 may include any or all of the following components: a telemetry data collector 602, a discovery engine 604, a log analyzer 606, a prediction engine 608, a configuration engine 610, an administration engine 612, a what-if tester 614, and/or a correlation analyzer 616. As would be appreciated, the functionalities of these components may be combined or omitted, as desired. In addition, these components may be implemented on a singular device or in a distributed manner, in which case the combination of executing devices can be viewed as their own singular device for purposes of executing application experience optimization process 248.

In various embodiments, telemetry data collector 602 may be responsible for gathering telemetry data from the local network of the remote worker, and/or any external networks, which includes information about the traffic itself (and the logical path which was taken). For example, telemetry data collector 602 may obtain telemetry data from Netflow records, a network visibility module (NVM), IPFIX information, deep packet inspection (DPI), or the like. Further telemetry data that telemetry data collector 602 may also obtain relate to the application experience for a specific application. Example data sources for such information may include, but are not limited to, ThousandEyes probes, WebEx/O365L7 labels, Application Response Time (ART) information, an application programming interface (API) to access application-sourced QoE metrics, or the like. Further telemetry data that telemetry data collector 602 may obtain could include other information indicative of the various interface(s) that may be available to the endpoint of the remote worker, such as a work-provided cellular plan, etc.

In various embodiments, discovery engine 604 may be responsible for the discovery of all active and potential logical network paths that could be taken by an endpoint to access a specific online application. To do so, discovery engine 604 may analyze the telemetry data collected by telemetry data collector 602 from the various available sources and make inferences about the possible interfaces and connectivity options available. For instance, if Netflow records indicate that Microsoft Office 365 (O365) traffic was observed on a DIA path using an LTE interface, discovery engine 604 may assume that this is a valid, active path for that online application. In addition, discovery engine 604 may also identify potential paths such as by identifying different combinations of available interfaces and connectivity options.

By way of example, discovery engine 604 may build the following table for O365 for a user working remotely from Paris at 3 PM:

TABLE 1

| Path No. | Local Interface | Connectivity Option | App. | Path Type | Current QoE |
|---|---|---|---|---|---|
| 1 | LTE | Datacenter 1 (VPN) | O365 | Active | 70% |
| 2 | LTE | DIA | O365 | Potential | 76% (low confidence) |
| 3 | Ethernet (DSL) | Datacenter 2 (VPN) | O365 | Active | 80% |
| 4 | Ethernet (DSL) | SIG Umbrella in London | O365 | Active | 85% |
| 5 | Ethernet (DSL) | SIG Umbrella in Paris | O365 | Potential (discovered from config. no traffic now) | 87% (low confidence) |

TABLE 1-continued

| Path No. | Local Interface | Connectivity Option | App. | Path Type | Current QoE |
|---|---|---|---|---|---|
| 6 | Ethernet (DSL) | Amsterdam | O365 | Active | 91% |
| 7 | Wi-Fi (SSID = 'blizzard') | DIA | O365 | Active | 92% |
| 8 | Wi-Fi (SSID = 'home') | | O365 | Active | 93% |

In yet another embodiment, discovery engine 604 may also interact with a user interface to allow a user to specify a path that could not be discovered automatically by discovery engine 604 sign the telemetry data. For instance, the user may specify that there is another home-specific interface available, such as a personal 5G connection or the like.

In addition, discovery engine 604 may also record a timeseries of the QoE for each application and path, based on the telemetry data from telemetry data collector 602. Note that initially it might be not possible for discovery engine 604 to precisely assess the application experience (QoE) for each of those paths. Indeed, some timeseries might be empty or with a low confidence, depending on the available telemetry from telemetry data collector 602. Accordingly, the components described below may be used to predict the QoE on the potential paths.

In some embodiments, log analyzer 606 may be responsible for additional enrichment of the above results using logs, event data, alarms, and the like. These additional types of telemetry may serve as machine learning features that can be used to predict the QoE on different paths. Such telemetry might be obtained from any number of sources. For example, an endpoint agent executed by the endpoint, such as a ThousandEyes endpoint agent, could share the received signal strength indicator (RSSI) and signal-to-noise ratio (SNR) values for each wireless SSID available to the endpoint and measure performance (application experience) based on real traffic flows over those paths. Similar attributes might also be obtained by log analyzer 606 from network control services, such as Cisco DNAC or similar service, a wireless controller, or the like. In some instances, all of this collected information could be stored in a datalake for analysis.

By way of example, assume that log analyzer 606 determines that on a specific SSID with RSSI=80 and using DIA, the application experience for O365 is 66%. Further, assume that it also determines that the DIA-associated access to O365 can spike to 91%. That may suggest that the relative position of the endpoint to the wireless access point has changed, which could be sent as a recommendation (e.g., "Dear user, move closer to your AP to get a 30% application experience increase for O365).

In various embodiments, prediction engine 608 may be responsible for generating predictions, based on the information from the above components. In general, these predictions may indicate optimal logical path from among the set of available paths, which could also be on a per-application basis and/or for a specific time period. In some instances, prediction engine 608 may also make short term predictions, long term predictions, or both, depending on what is the most appropriate.

Example prediction techniques that prediction engine 608 could use may include, but are not limited to, regression, statistical approaches, Bayesian approaches, or others. In more complex scenarios, multiple prediction techniques could also be used and their results combined. For instance, it might be that for different telemetry sources, different prediction approaches provide the best results (but it can be also per user/location/application, etc.). In addition, prediction engine 608 may also reevaluate the performance of its prediction model(s) and initiate retraining as needed.

In various embodiments, configuration engine 610 may be responsible for causing the optimal path predicted by prediction engine 608 to be used. To do so, configuration engine 610 might use various mechanisms to reprogram/reconfigure different solutions, such as by configuring a split tunneling policy, instructing an agent on the endpoint to use a particular SSID by default, configuring a security program on the endpoint to use a PoP in a specific location, etc. Of course, in further embodiments, configuration engine 610 may cause the recommended path to be used by providing an indication to a user interface, such as in the case of an interface that was not discoverable by discovery engine 604.

In various embodiments, administration engine 612 may be responsible for reviewing potential paths, policy definitions, and preferences. For example, an administrator might be given the recommendation, via a user interface, and define a policy whereby certain users should send specific traffic (e.g., O365 traffic) using DIA instead of via Zscaler SIG in London. Since that kind of decision might be correlated with security policies, the administrator may opt to accept or reject the recommendation, based on their expertise. Of course, that that definition can also be automatically applied and reused in the subsequent recommendations, in some instances.

In some cases, administration engine 612 may also interact with a user interface, to allow an administrator to specify which application(s) are to be optimized. For instance, the administrator may specify that optimization should only be performed for O365 and WebEx traffic, but not for any other applications. Based on these parameters, prediction engine 608 may also take this into account when making its predictions. For instance, prediction engine 608 may generate a path recommendation that greatly improves the experience of O365 but at the expense of slightly degrading the application experience of Salesforce (which is in line with what was specified by the administrator).

In another embodiment, the administrator may be able to specify the conditions under which more expensive paths may be recommended. For instance, prediction engine 608 may be constrained to only recommend the use of an LTE-based path up to a certain amount of traffic or if the predicted improvement to the application experience is above a defined threshold. Of course, administration engine 612 may also take into account a mixture of network administrator and user policy decisions, as well, such as also obtaining feedback from the user of the endpoint.

In various embodiments, what-if tester 614 may be responsible of assessing the available bandwidth or other metrics of a path and testing "what if" scenarios. For example, if a decision was made to redirect O365 traffic from a Wi-Fi interface to an LTE interface, what-if tester 614 may estimate the impact on the application experience with the increased LTE utilization. To answer such a question, what-if tester 614 may rely on historical values, such as the application experience metrics for) 365 under similar loads and conditions.

As would be appreciated, what-if tester 614 may operate in conjunction with prediction engine 608, to predict the optimal path. In one embodiment, uncertainty around the path QoE metrics can be quantified as a function of multiple features using, say, a Gaussian Process. If the uncertainty for a particular set of features is lower than a threshold and the QoE is good, a decision can be made to use the path. In other embodiments, causal models can be used by what-if tester 614 to answer such "what-if" questions.

In various embodiments, correlation analyzer 616 may be responsible for inferring the potential application experience for a given application on a particular path. To do so, correlation analyzer 616 may perform cross-telemetry and/or cross-customer (e.g., endpoint or local network) correlation. For instance, correlation analyzer 616 may assess Layer 3 telemetry from ThousandEyes and WebEx to infer the potential O365 application experience on a given path. Moreover, correlation analyzer 616 may even leverage telemetry data for one endpoint or endpoint network to optimize the application experience for a different one. For instance, if the application traffic for one endpoint/remote worker in Paris is being optimized using a certain path, correlation analyzer 616 may determine that another endpoint/remote worker is likely to have very similar telemetry data and leverage the telemetry data for the first endpoint/remote worker to make predictions for the second, as well.

Figure 7:
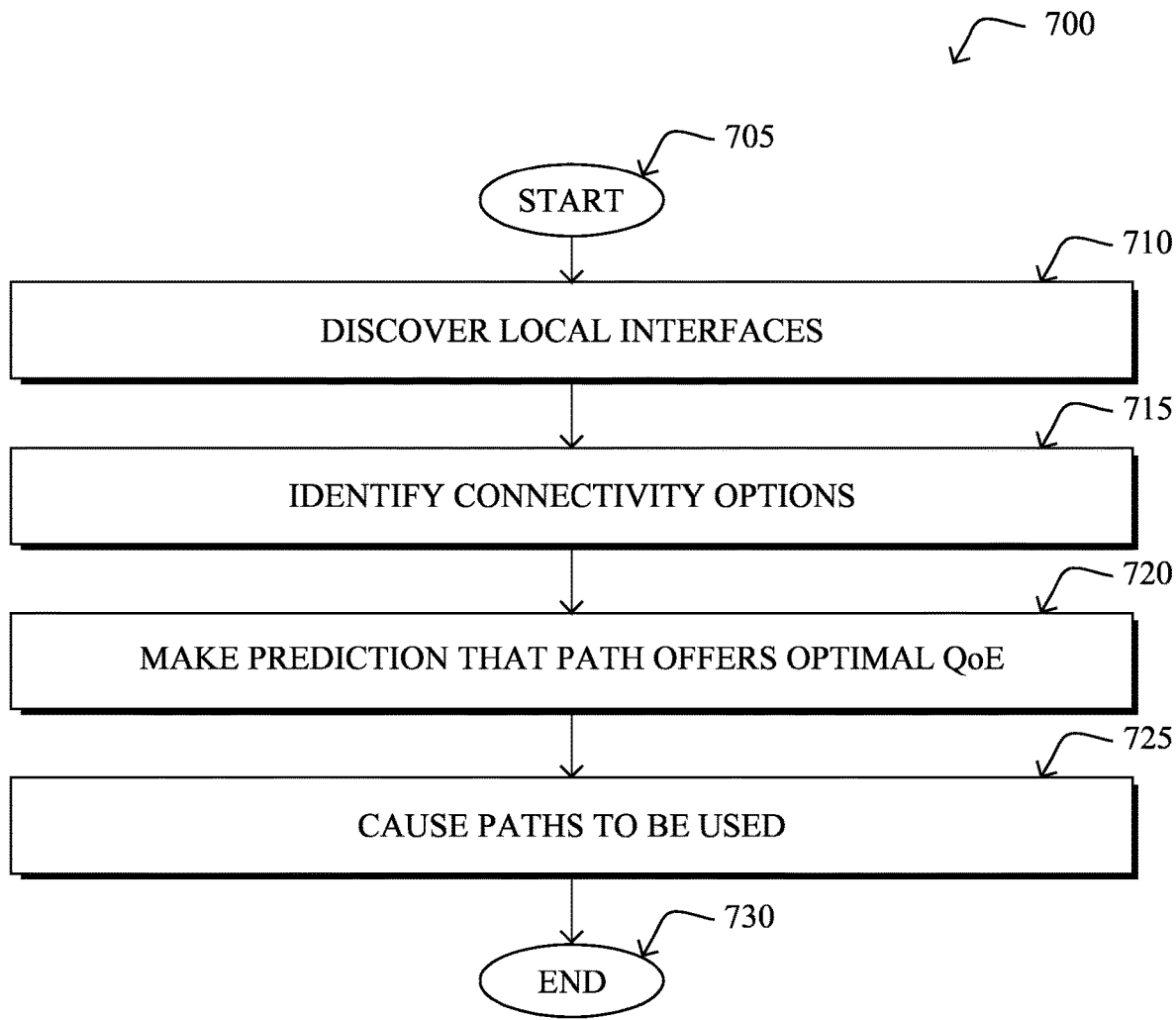
FIG. 7 illustrates an example simplified procedure for predictive application-aware routing for remote work.

FIG. 7 illustrates an example simplified procedure 700 (i.e., a method) for predictive application-aware routing for remote work, in accordance with one or more embodiments described herein. For example, a non-generic, specifically configured device (e.g., device 200), such as controller for a network (e.g., an SDN controller or other device in communication therewith,), a networking device, etc., may perform procedure 700 by executing stored instructions (e.g., application experience optimization process 248). The procedure 700 may start at step 705, and continues to step 710, where, as described in greater detail above, the device may discover one or more network interfaces that an endpoint in a local network could use to access an online application. In some embodiments, the device may do so in part by analyzing telemetry data captured by an agent executed by the endpoint. In various embodiments, the one or more network interfaces comprises one or more of: an Ethernet interface, a Wi-Fi interface, an Ethernet interface, a cellular interface, or a satellite communications interface. In one embodiment, the local network is a home network, such as that used by a remote worker.

At step 715, as detailed above, the device may identify a plurality of connectivity options available to the endpoint to access the online application via an external network. In some embodiments, the plurality of connectivity options comprises a Direct Internet Access (DIA) connection or a connection to a point of presence (PoP) for a cloud-hosted security service via which the online application can be accessed. In further embodiments, the plurality of connectivity options comprises a virtual private network (VPN) connection to a first location and a VPN connection to a second location.

At step 720, the device may make a prediction that a path that comprises a particular connectivity option from among the plurality of connectivity options and a particular network interface from among the one or more network interfaces will provide an optimal quality of experience metric associated with the online application. In some embodiments, the device may also provide an indication of the prediction to a user interface for display. In some embodiments, the device may make the prediction in part by performing what-if testing of a plurality of paths that comprise different pairs of the plurality of connectivity options and the one or more network interfaces. In one embodiment, the prediction is for a limited amount of time (e.g., n-number of minutes, hours, days, etc.). In yet another embodiment, the prediction may be based in part on telemetry data from the external network associated with a different local network.

At step 725, as detailed above, the device may cause the endpoint to use the path to connect to the online application. For instance, the device may send an instruction to the endpoint itself, a supervisory device that controls the operation of the endpoint, configure any corresponding networking devices or services, or the like. Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for predictive application-aware routing for remote work, it is to be understood that various other adaptations and modifications may be made within the spirit and scope of the embodiments herein. For example, while certain embodiments are described herein with respect to using certain models for purposes of predicting application experience metrics, SLA violations, or other disruptions in a network, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
discovering, by a device, one or more network interfaces that an endpoint in a local network could use to access an online application;
identifying, by the device using a discovery engine that analyzes telemetry data from the endpoint, a plurality of connectivity options available to the endpoint to access the online application via an external network, wherein the discovery engine infers the plurality of connectivity options based on historical and real-time network telemetry;
making, by the device, a prediction that a path that comprises a particular connectivity option from among the plurality of connectivity options and a particular network interface from among the one or more network interfaces will provide an optimal quality of experience metric associated with the online application, wherein the prediction is based on the telemetry data and on inferred correlations between past telemetry patterns and quality of experience for the online application; and
causing, by the device, the endpoint to be configured to use the path to connect to the online application.

2. The method as in claim 1, further comprising:
providing, by the device, an indication of the prediction to a user interface for display.

3. The method as in claim 1, wherein making the prediction that the path will provide an optimal quality of experience metric associated with the online application comprises:
performing, by the device, what-if testing of a plurality of paths that comprise different pairs of the plurality of connectivity options and the one or more network interfaces.

4. The method as in claim 1, wherein discovering the one or more network interfaces comprises:
analyzing telemetry data captured by an agent executed by the endpoint.

5. The method as in claim 1, wherein the one or more network interfaces comprises one or more of: an Ethernet interface, a Wi-Fi interface, an Ethernet interface, a cellular interface, or a satellite communications interface.

6. The method as in claim 1, wherein the plurality of connectivity options comprises a Direct Internet Access (DIA) connection or a connection to a point of presence (POP) for a cloud-hosted security service via which the online application can be accessed.

7. The method as in claim 1, wherein the plurality of connectivity options comprises a virtual private network (VPN) connection to a first location and a VPN connection to a second location.

8. The method as in claim 1, wherein the prediction is for a limited amount of time.

9. The method as in claim 1, wherein the prediction is based in part on telemetry data from the external network associated with a different local network.

10. The method as in claim 1, wherein the local network is a home network.

11. An apparatus, comprising:
one or more network interfaces;
a processor coupled to the one or more network interfaces and configured to execute one or more processes; and
a memory configured to store a process that is executable by the processor, the process when executed configured to:
discover one or more network interfaces that an endpoint in a local network could use to access an online application;
identify, using a discovery engine that analyzes telemetry data from the endpoint, a plurality of connectivity options available to the endpoint to access the online application via an external network, wherein the discovery engine infers the plurality of connectivity options based on historical and real-time network telemetry;
make a prediction that a path that comprises a particular connectivity option from among the plurality of connectivity options and a particular network interface from among the one or more network interfaces will provide an optimal quality of experience metric associated with the online application, wherein the prediction is based on the telemetry data and on inferred correlations between past telemetry patterns and quality of experience for the online application; and cause the endpoint to be configured to use the path to connect to the online application.

12. The apparatus as in claim 11, wherein the process when executed is further configured to:
provide an indication of the prediction to a user interface for display.

13. The apparatus as in claim 11, wherein the apparatus makes the prediction that the path will provide an optimal quality of experience metric associated with the online application by:
performing what-if testing of a plurality of paths that comprise different pairs of the plurality of connectivity options and the one or more network interfaces.

14. The apparatus as in claim 11, wherein the apparatus discovering the one or more network interfaces by:
analyzing telemetry data captured by an agent executed by the endpoint.

15. The apparatus as in claim 11, wherein the one or more network interfaces comprises one or more of: an Ethernet interface, a Wi-Fi interface, an Ethernet interface, a cellular interface, or a satellite communications interface.

16. The apparatus as in claim 11, wherein the plurality of connectivity options comprises a Direct Internet Access (DIA) connection or a connection to a point of presence (POP) for a cloud-hosted security service via which the online application can be accessed.

17. The apparatus as in claim 11, wherein the plurality of connectivity options comprises a virtual private network (VPN) connection to a first location and a VPN connection to a second location.

18. The apparatus as in claim 11, wherein the prediction is for a limited amount of time.

19. The apparatus as in claim 11, wherein the prediction is based in part on telemetry data from the external network associated with a different local network.

20. A tangible, non-transitory, computer-readable medium storing program instructions that cause a device to execute a process comprising:
discovering, by the device, one or more network interfaces that an endpoint in a local network could use to access an online application;
identifying, by the device using a discovery engine that analyzes telemetry data from the endpoint, a plurality of connectivity options available to the endpoint to access the online application via an external network, wherein the discovery engine infers the plurality of connectivity options based on historical and real-time network telemetry;
making, by the device, a prediction that a path that comprises a particular connectivity option from among the plurality of connectivity options and a particular network interface from among the one or more network interfaces will provide an optimal quality of experience metric associated with the online application, wherein the prediction is based on the telemetry data and on inferred correlations between past telemetry patterns and quality of experience for the online application; and
causing, by the device, the endpoint to be configured to use the path to connect to the online application.

* * * * *